Patented Apr. 1, 1924.

1,488,608

UNITED STATES PATENT OFFICE.

HOWARD W. MATHESON, OF MONTREAL, QUEBEC, CANADA, ASSIGNOR TO SHAWINIGAN LABORATORIES, LIMITED, OF MONTREAL, QUEBEC, CANADA.

LIQUID OR PLASTIC CELLULOSE COMPOSITION.

No Drawing.   Application filed November 10, 1919. Serial No. 336,892.

*To all whom it may concern:*

Be it known that I, HOWARD W. MATHESON, a subject of the King of Great Britain, and resident of the city of Montreal, in the Province of Quebec and Dominion of Canada, have invented certain new and useful Improvements in Liquid or Plastic Cellulose Composition, of which the following is a full, clear, and exact description.

This invention relates to improvements in compositions of matter formed from the esters of cellulose, such as cellulose acetate and cellulose formate, and the object of the invention is to provide a composition of this type which may be manufactured more cheaply and used with a greater degree of safety than heretofore, and in which the product has a greater degree of durability.

Up to the present time, various compositions have been used containing cellulose acetate and solvents for the same. These compositions have been used for lacquers, bronzing liquids and plastics. One of the principal uses of cellulose acetate compounds in recent years has been as a varnish for coating aeroplane wings to render them windproof, fireproof and waterproof. These compositions have been made by dissolving cellulose acetate in a suitable solvent, such as acetylene tetrachloride and adding thereto suitable diluents, such as acetone, methyl alcohol, benzol, etc. There are a number of disadvantages, however, attached to the use of such solvents. The acetylene tetrachloride, although suitable in all other respects, is highly poisonous and has a very detrimental effect on the workmen who are in continuous contact with the material. Furthermore, films prepared from such a solution have a tendency to deteriorate rapidly in sunlight which may or may not be due to the tetrachloride used.

In spite of these disadvantages, up until the present time acetylene tetrachloride has been adhered to as being the only practical, high-boiling solvent, which can be supplied at a reasonable price.

According to the present invention, desired solutions and plastics of the esters of cellulose are prepared by the use of ethylidene diacetate (boiling point 169° C.) as a solvent either alone or in conjunction with any suitable complementary solvent such as ethyl or methyl alcohol, to which solvent, diluents such as benzol or toluol, may be added if desired. Such a solvent may be more cheaply produced and has the advantage of being non-poisonous, thus having no detrimental effect on those working with it. Ethylidene diacetate alone is but an indifferent solvent for esters of cellulose, requiring some time for complete solution. However, when a complementary solvent such as methyl or ethyl alcohol, not necessarily itself a solvent for a cellulose ester, is mixed with ethylidene diacetate, solution takes place most readily, the resultant material being a clear and nicely-flowing liquid. For example, cellulose acetate dissolves slowly in pure ethylidene diacetate but rapidly in a mixture of ethylidene diacetate and alcohol, although the cellulose acetate is in itself completely insoluble in the methyl or ethyl alcohol used. The resultant products obtained from these solutions consisting of films and plastics, are of good quality and durability. To give a more thorough understanding of the invention, the following examples are cited, but it must be understood that the invention is in no way limited to these examples:—

1st. 1 kilo cellulose acetate is completely dissolved in 10 litres ethylidene diacetate and 15 litres ethyl alcohol. When solution is complete, which requires but a short time, 10 litres of benzol may be added as a diluent, or the benzol may be added at the same time as the solvent.

2nd. 1 kilo cellulose acetate will completely dissolve in 5 litres ethylidene diacetate and 7.5 litres ethyl alcohol, to which may be added 5 litres benzol as a diluent.

In place of ethyl alcohol, methyl or wood alcohol may be used, with somewhat better results, due to the non-hydroscopic properties of the methyl alcohol; also acetone may be used in place of the alcohol, and possesses the additional advantage of being itself a solvent for the cellulose acetate.

Example 2 illustrates the use of this material as a lacquer for aeroplane work and is also satisfactory for the preparation of non-inflammable cellulose acetate films.

3rd. For the preparation of plastics, the following composition is satisfactory;

50 kilos cellulose acetate,
15 kilos ethylidene diacetate,
10 kilos tricresyl phosphate,
35 litres of alcohol.

This mixture is kneaded and is then rolled into sheets or pressed into rods or blocks as required.

Obviously, the basic composition may be mixed with any suitable ingredients for the purpose of hardening or coloring the same.

While the foregoing examples deal solely with cellulose acetate it will be understood that other esters of cellulose may be used according to the product desired, complementary solvents and possibly diluents suitable for the purpose in view being combined with the ethylidene diacetate. Obviously it is impossible, in the scope of a specification, to mention all the complementary solvents and diluents which may be used with the ethylidene diacetate or to point out the particular ones specially adapted for use with each of the cellulose esters, therefore, the examples have been limited to the substances most generally used.

By the term "complementary solvent" as used in the foregoing specification and the following claims, is meant a substance not necessarily itself a solvent for a cellulose ester but which, when mixed with ethylidene diacetate, greatly increases either the solvent properties of the diacetate or the solubility of the cellulose ester. The exact manner in which the complementary solvent acts is immaterial, the fact remaining that a great deal more ester is dissolved in the diacetate combined with the complementary solvent than in the diacetate alone.

Having thus described my invention, what I claim is:—

1. A composition of matter containing an ester of cellulose and ethylidene diacetate.

2. A composition of matter containing an ester of cellulose, ethylidene diacetate and a complementary solvent.

3. A composition of matter containing an ester of cellulose, ethylidene diacetate, a complementary solvent and a diluent.

4. A composition of matter containing ethylidene diacetate and a complementary solvent.

5. A composition of matter containing ethylidene diacetate and a complementary solvent admixed therewith, the mixture having greater efficiency than pure ethylidene diacetate as a solvent for the ester of cellulose.

6. A composition of matter containing a fatty acid ester of cellulose, ethylidene diacetate and a solidifying agent.

7. A composition of matter containing an ester of cellulose, ethylidene diacetate and a coloring agent.

8. A composition of matter containing cellulose acetate and ethylidene diacetate.

9. A composition of matter comprising a solution of a fatty acid ester of cellulose in ethylidene diacetate.

10. A composition of matter containing cellulose acetate, ethylidene diacetate and an alcohol.

11. A composition of matter comprising a solution of a fatty acid ester of cellulose in ethylidene diacetate and an alcohol.

12. A composition of matter containing a fatty acid ester of cellulose, ethylidene diacetate, alcohol and a diluent.

13. A composition of matter containing a fatty acid ester of cellulose, ethylidene diacetate, alcohol and benzol.

14. A composition of matter containing a fatty acid ester of cellulose, ethylidene diacetate and a complementary solvent admixed therewith, the mixture being a better solvent for the fatty acid ester than ethylidene diacetate alone.

15. A composition of matter containing a fatty acid ester of cellulose, ethylidene diacetate and a second volatile solvent.

16. A composition of matter containing a fatty acid ester of cellulose, ethylidene diacetate, a second volatile solvent and a non-volatile solvent.

17. A composition of matter containing a fatty acid ester of cellulose, ethylidene diacetate, a second volatile solvent and a non-volatile latent solvent.

18. A composition of matter containing a fatty acid ester of cellulose, ethylidene diacetate as solvent therefor and volatile and non-volatile solvents.

In witness whereof, I have hereunto set my hand.

HOWARD W. MATHESON.